United States Patent
Brantl et al.

(10) Patent No.: US 6,894,082 B2
(45) Date of Patent: May 17, 2005

(54) FOAMABLE COMPOSITIONS

(75) Inventors: Karen R. Brantl, West Springfield, MA (US); Philp T. Klemarczyk, Canton, CT (US)

(73) Assignee: Henkel Corporation, Rocky Hill, CT (US)

( * ) Notice: Subject to any disclaimer, the term of this patent is extended or adjusted under 35 U.S.C. 154(b) by 147 days.

(21) Appl. No.: 10/243,853

(22) Filed: Sep. 16, 2002

(65) Prior Publication Data

US 2004/0063800 A1 Apr. 1, 2004

(51) Int. Cl.[7] .............................. C08J 9/06; C08J 9/08; C08J 9/10
(52) U.S. Cl. ...................... 521/50.5; 521/89; 521/120; 521/142; 521/147; 522/75; 522/96; 522/114; 522/117
(58) Field of Search ................... 521/50.5, 89, 120, 521/142, 147; 522/90, 75, 96, 114, 117

(56) References Cited

U.S. PATENT DOCUMENTS

| | | | |
|---|---|---|---|
| 3,218,305 A | 11/1965 | Krieble | 260/89.5 |
| 3,425,964 A | 2/1969 | Henry | 260/2.5 |
| 3,592,782 A | 7/1971 | Weber | 260/2.5 |
| 4,180,640 A | 12/1979 | Melody et al. | 526/323.1 |
| 4,287,330 A | 9/1981 | Rich | 526/270 |
| 4,321,349 A | 3/1982 | Rich | 526/270 |
| 4,686,244 A | 8/1987 | Dietlein et al. | 523/179 |
| 4,808,634 A | 2/1989 | Uriarte et al. | 521/87 |
| 4,954,415 A | 9/1990 | Davis et al. | 430/138 |
| 5,061,736 A | 10/1991 | Takahashi et al. | 521/91 |
| 5,246,973 A | 9/1993 | Nakamura et al. | 521/54 |
| 5,356,940 A | 10/1994 | Giesen | 521/77 |
| 5,358,975 A | 10/1994 | Anderson | 521/77 |
| 5,373,021 A | 12/1994 | Marangos | 514/483 |
| 5,575,526 A | 11/1996 | Wycech | 296/205 |
| 5,900,438 A | 5/1999 | Miyoshi et al. | 521/77 |
| 6,003,274 A | 12/1999 | Wycech | 52/232 |
| 6,092,864 A | 7/2000 | Wycech et al. | 296/204 |
| 6,110,982 A | 8/2000 | Russick et al. | 521/54 |
| 6,207,730 B1 | 3/2001 | Hogan, III | 523/219 |
| 6,218,442 B1 | 4/2001 | Hilborn et al. | 521/85 |
| 6,277,898 B1 | 8/2001 | Pachl et al. | 522/100 |
| 6,562,878 B2 * | 5/2003 | Blank et al. | 521/50.5 |
| 6,638,635 B2 * | 10/2003 | Hattori et al. | 428/500 |

* cited by examiner

Primary Examiner—Morton Foelak
(74) Attorney, Agent, or Firm—Steven C. Bauman

(57) ABSTRACT

This invention relates to latent foamable compositions for use in or as adhesives, sealants and/or coatings. The compositions include a curable component or a thermoplastic component, together with a latent foaming agent. In curable versions of the inventive compositions, a cure initiator or catalyst may also be included.

25 Claims, 1 Drawing Sheet

FOAMABLE COMPOSITIONS

BACKGROUND OF THE INVENTION

1. Field of the Invention

This invention relates to latent foamable compositions for use in or as adhesives, sealants and/or coatings. The compositions include a curable component or a thermoplastic component, together with a latent foaming agent. The latent foaming agent is capable of ambient temperature performance when exposed to UV radiation, or elevated temperature performance. In curable versions of the inventive compositions, a cure initiator or catalyst may also be included.

2. Brief Description of Related Technology

The commercial marketplace for adhesives, coatings and sealants, which are cured by exposure to UV or visible light radiation, is a rapidly growing segment of the adhesives industry. The advantages of such UV or visible light curing include providing products with a larger percentage of reactive materials, on-demand curability, fast curability, minimized opportunity to compromise the integrity of the parts to be bonded or sealed, and lower energy consumption, as contrasted to conventional heat cure processing.

Perhaps the most widely used UV or visible light curing formulations, which are initiated by free radicals, include generally mono- and di-functional (meth)acrylate monomers, a photoinitiator, and optionally, an acrylate-functional pre-polymer. The photoinitiator generates free radicals on exposure to UV or visible light that initiate cure. However, (meth)acrylate based formulations are known to possess certain limitations generally, including oxygen inhibition of (meth)acrylate polymerization at the air/coating interface, limited cure through depth, and difficulty in curing highly pigmented systems.

Various methods have been studied to overcome or minimize oxygen inhibition at the coating/air interface, such as the use of high intensity light, dual-cure mechanisms, or placing a physical barrier over the coating.

The use of o-acylthiohydroxamates has been reported to reduce the tack free time of UV curable coatings, to which they have been added. Indeed, in U.S. Pat. No. 4,954,415 (Davis), a photohardenable composition including a free radical addition polymerizable material and a photoinitiator composition is claimed. The photoinitiator composition includes a compound, which absorbs actinic radiation and directly or indirectly generates free radicals, and an o-acylthiohydroxamate or an N-alkoxypyridinethione. The compositions described in the '415 patent were developed for and are reported as useful in photoimaging applications.

o-Acylthiohydroxamates generally decompose on exposure to UV radiation to provide radicals, which can either recombine or initiate acrylate polymerization at the surface to overcome oxygen inhibition, as seen below in eq. 1. The major by-product of the reaction is an alkylpyridyl sulfide, 2.

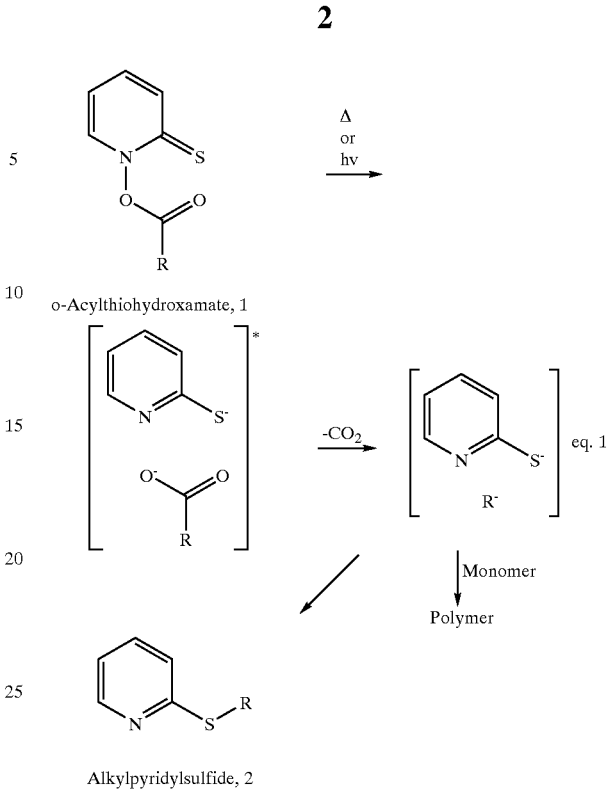

o-Acylthiohydroxamate, 1

Alkylpyridylsulfide, 2

To date, however, it has not been recognized or reported that such materials may form the basis for a foaming system, particularly for use in a plastic matrix.

Rather, creating foamed polymers generally involves the use of for example a blowing agent, which yields a gas on thermal exposure, the production of carbon dioxide by the reaction of a diisocyanate with water, or the generation of a foam by the addition of a gas or low boiling liquid to a molten polymer. To that end, many foamable compositions are known. See e.g. U.S. Pat. Nos. 4,686,244 (Dietlin) and 5,246,973 (Nakamura). See also U.S. Pat. Nos. 4,808,634 (curable foaming silicone composition containing a vinyl polysiloxane, a hydride polysiloxane, a hydroxyl source selected from organic alcohol or organic alcohol in combination with water or hydroxylated organosiloxane, from 1 to about 250 ppm of platinum catalyst and a ketoximine compound effective to lower the foam density. Foam is created through the reaction of the hydride polysiloxane with the hydroxy source to liberate hydrogen gas.); 5,358,975 (organosiloxane elastomeric foams, incorpoarting a triorganosiloxy end-blocked polydiorgano siloxane, an organohydrogen siloxane, a platinum catalyst, an $\alpha$, $\beta$, $\omega$-diol and a resinous copolymer containing siloxy vinyl groups. Foaming is produced as a result of the reaction of the polyhydrogen siloxane and the alcohol which liberate hydrogen gas.); 6,110,982 and 5,373,027 (use of blowing agents to effectuate foams); 6,207,730 B1 (epoxy composition to which is added thermoplastic shell microspheres, which may encapsulate a gas.); 6,277,898 B1 (epoxy resins useful as photocurable paints which use chemical or mechanical expansion agents to create foams.); and 5,356,940 (fine pored silicone foam which is formed by mixing a vinyl silicone, an organo-platinum catalyst, fumed silica, and water as a first part, with a second part which includes a silicone polymer having at least two double bonds per molecule, fumed silica and polydimethylhydrogensiloxane.

The two components are mixed and the reaction is subsequently pressurized, using air or nitrogen, so that the pressurized gas is present in the mixture in a dissolved form. Subsequently, the reaction mixture is heated and the dissolved gas is released, thereby forming a fine pored silicone foam.); 5,900,430 (silicone foaming compositions which contain an organopolysiloxane containing a specified amount of an alkenyl group and/or a hydroxyl group, an organohydrogenpolysiloxane, a compound having an active hydrogen, such as an alcohol, a platinum catalyst and an acetylenic alcohol compound. Foaming occurs during the cure process by the reaction of the compound having an active hydrogen group, i.e., an alcohol, with the organohydrogenpolysiloxane compound to release hydrogen gas.); 5,061,736 (foamable silicone compositions useful as fire-resistant joint-sealing members. The compositions disclosed contain a diorganopolysiloxane, a finely divided reinforcing silica filler, a powder of a ferrite such as a divalent metallic element such as manganese, copper, nickel, from 10 to 70 parts by weight of a finely divided inorganic material, such as mica or glass powders, finely divided platinum metal, a curing agent for silicone rubbers such as a peroxide or condensation catalyst, and the blowing agent is a composition which produces a foaming gas when exposed to elevated temperature, such as nitrogen, carbon dioxide, azobisiobutyronitrile.); 6,003,274 (reinforcement web for a hollow structural member having layer of expandable foam—a resin-based material containing a blowing agent—dispersed on its principal surfaces.); 5,575,526 and 6,092,864 (laminates which have support members or beams bonded together with a structural foam layer, produced by a synthetic structural resin combined with a cell-forming agent (blowing agent) and hollow microspheres); 6,218,442 B1 (corrosion-resistant foam formulation which includes one or more thermosettable synthetic resins, one or more curatives, one or more blowing agents and one or more organic titanates or zirconates.)

Notwithstanding the state-of-the-art, it would be desirable to provide a latent foaming agent for use with a matrix—whether or not curable—, which matrix is destined for use in applications where foaming or dimensional expansion may be desirable.

SUMMARY OF THE INVENTION

The present invention is directed to a latent foamable composition, which includes a matrix component, which may be a curable and/or thermoplastic component, and a latent foaming agent. Where a curable component is present, it is often desirable to provide an initiator or catalyst component, as well.

Upon exposure to conditions sufficient to foam the inventive compositions, an increase in dimension is observed to occur in at least one direction. For instance, at a concentration of 2 phr of the latent foaming agent, the inventive compositions may increase in height by 8%, at a concentration of 3 phr of the latent foaming agent, the inventive compositions may increase in height by 84%, and at a concentration of 4 phr of the latent foaming agent, the inventive compositions may increase in height by 113%.

With heat-induced foamable compositions, at a concentration of 8 phr of the latent foaming agent, the inventive compositions may increase in height by 100%.

The matrix component may be selected generally from curable monomers, oligomers and polymers, and thermoplastic oligomers and polymers. The curable component may be functionalized either in the terminal portion, pendant portion, or both, with reactive groups such as (meth) acrylates, alkoxides (attached to a silicone atom, or silylated alkoxides), aryloxides (attached to a silicone atom, or silylated aryloxides), vinyls (attached to a silicone, or silylated vinyls), vinyl ethers, hydrides (attached to a silicone atom, or silicon hydrides), hydroxyls, isocyanates and epoxies, as well as combinations thereof.

The oligomers and polymers may be selected from a wealth of possibilities, examples of which are given below.

An initiator or catalyst component may also be included, and when included may be chosen from radiation triggered initiators or catalysts, or thermally triggered initiators or catalysts. In addition, anaerobic cure inducing compositions may also be included.

The inventive latent foaming agent is within the following structure I

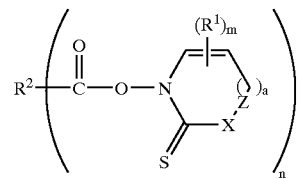

where $R^1$ is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl, and $C_{2-24}$ alkenyl, X is carbon or sulfur, Z is a single bond or double bond, and a is 0 or 1, m is 0–4, and n is 1–4.

Desirably, when X is carbon, Z is a double bond and a is 1 and n is 1, and when X is sulfur, Z is a single bond, a is 0 and n is 1.

More specific examples of the photo-induced foaming agent are within the following structures II and III, respectively

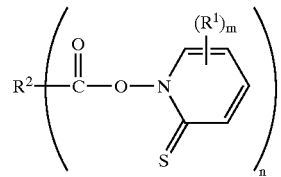

where $R^1$ is is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl, and $C_{2-24}$ alkenyl, m is 0–4, and n is 1–4.

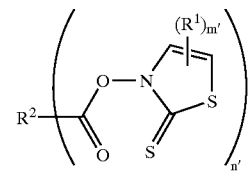

where $R^1$ is is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl, and $C_{2-24}$ alkenyl, m' is 0–2, and n' is 1–4.

In another aspect, the present invention is directed to a method of making a foamable composition. The method includes the steps of providing a matrix component; providing a latent foaming agent; and mixing together the matrix component and the latent foaming agent.

In a further aspect, the present invention is directed to a method of foaming a latent foamable composition. This method includes the steps of dispensing the foamable composition onto at least a portion of a first substrate, exposing the dispensed composition to conditions appropriate to foam the composition and mating to the foamed composition a second substrate to form an article mated with the foamed composition. And a foamed composition is formed between the parts of the article.

DETAILED DESCRIPTION OF THE INVENTION

Figure 1:
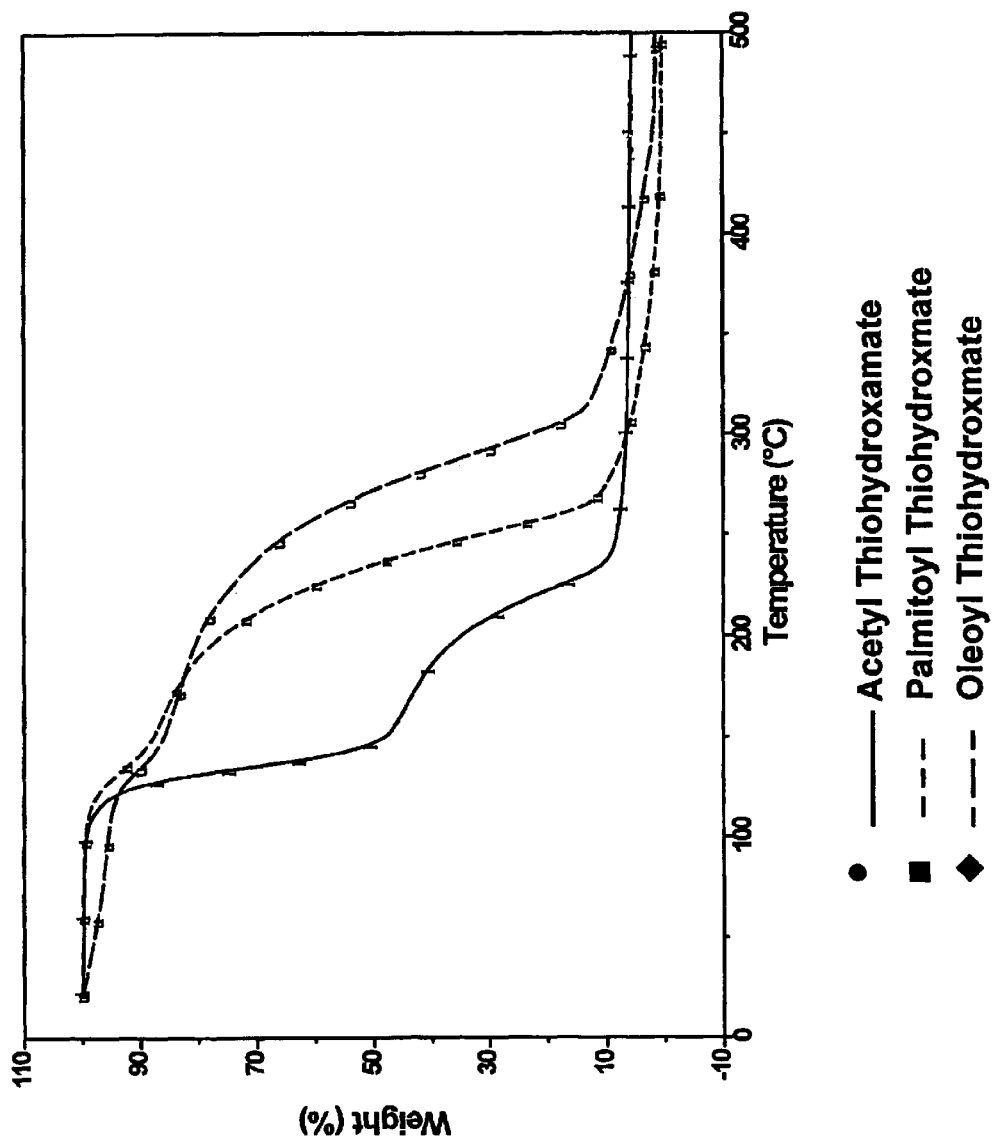
FIG. 1 depicts TGA analysis for acetyl thiohydroxamate, 3, palmitoyl thiohydroxamate, 6, and oleoyl thiohydroxamate, 7, indicating decomposition beginning at temperatures about 100° C.

The present invention is directed to a matrix component, which may be curable and/or thermoplastic, and a latent foaming agent. The latent foaming agent includes compounds comprising the following structure I

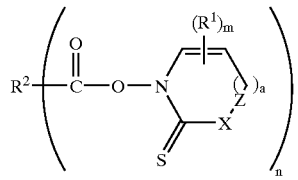

where $R^1$ is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl, and $C_{2-24}$ alkenyl, X is carbon or sulfur, Z is a single bond or double bond, and a is 0 or 1, m is 0–4, and n is 1–4.

More specific examples of the latent foaming agent includes compounds comprising one or the other of the following structures II and III

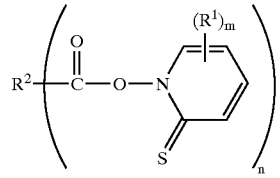

where $R^1$ is is H, $C_{1-4}$ alkyl, with or without interruption or substitution by oxygen, sulfur, nitrogen, and aryl, $R^2$ is $C_{1-24}$ alkyl, with or without interruption or substitution by oxygen, sulfur, nitrogen, aralkyl and $C_{2-24}$ alkenyl, and m is 0–4, and n is 1–4.

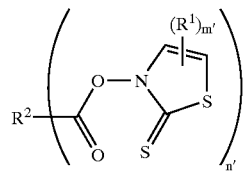

where $R^1$ is is H, $C_{1-4}$ alkyl, with or without interruption or substitution by oxygen, sulfur, nitrogen, and aryl, $R^2$ is $C_{1-24}$ alkyl, with or without interruption or substitution by oxygen, sulfur, nitrogen, aralkyl and $C_{2-24}$ alkenyl, m' is 0–2, and n' is 1–4.

Examples of compounds comprising structure II include and aliphatic and alicyclic esters of N-hydroxythiohydroxamate. Specific examples include 3,3-diphenylpropionyl thiohydroxamate, 1-methylcyclohexylcarbonyl thiohydroxamate, acetyl thiohydroxamate, propionyl thiohydroxamate, octanoyl thiohydroxamate, palmitoyl thiohydroxamate, oleoyl thiohydroxamate, and cyclopentanoyl thiohydroxamate, though a particularly desirable one is palmitoyl thiohydroxamate, shown below.

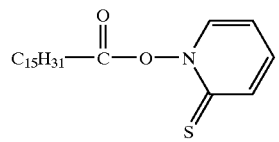

Additional specific examples of compounds comprising structure III include O-esters of 4-methyl-N-hydroxy thiazolethione. Specific examples include 3-palmitoyl-4-phenyl thiazolethione, and 3,3-diphenylpropionyl thiazolethione, though a particularly desirable one is palmitoyl thiazolethione, shown below.

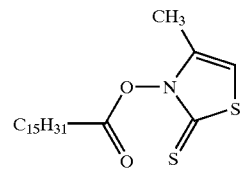

The inventive latent foaming agent may be used in an amount within the range of about 0.05 to about 20 phr, such as about 1 to about 12 phr, desirably about 5 to about 10 phr, depending of course on the nature and identity of the matrix and the latent foaming agent.

As noted above, the matrix component may be selected generally from curable monomers, oligomers and polymers, and thermoplastic oligomers and polymers. The curable component may be functonalized either in the terminal portion, pendant portion, or both, with reactive groups such as (meth)acrylate, alkoxides (attached to a silicone atom, or silylated alkoxides), aryloxides (attached to a silicone atom, or silylated aryloxides), vinyls (attached to a silicone, or silylated vinyls), vinyl ethers, hydrides (attached to a silicone atom, or silicon hydrides), hydroxyl, isocyanate and epoxy, as well as combinations thereof.

As used herein, the terms (meth)acrylic and (meth)acrylate are used synonymously with regard to the monomer and monomer-containing component. The terms (meth)acrylic and (meth)acrylate include acrylic, methacrylic, acrylate and methacrylate.

The (meth)acrylate component may comprise one or more members selected from a monomer represented by the formula:

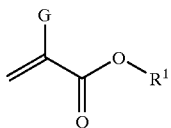

where G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone;

urethane acrylates or ureide acrylates represented by the formula:

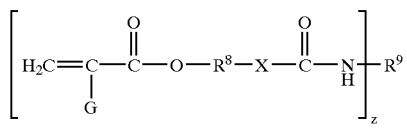

where

G is hydrogen, halogen, or an alkyl having from 1 to 4 carbon atoms;

$R^8$ denotes a divalent aliphatic, cycloaliphatic, aromatic, or araliphatic group, bound through a carbon atom or carbon atoms thereof indicated at the —O— atom and —X— atom or group;

X is —O—, —NH—, or —N(alkyl)—, in which the alkyl radical has from 1 to 8 carbon atoms;

z is 2 to 6; and $R^9$ is a z-valent cycloaliphatic, aromatic, or araliphatic group bound through a carbon atom or carbon atoms thereof to the one or more NH groups; and a di- or tri-(meth)acrylate selected from polyethylene glycol di(meth)acrylates, bisphenol-A di(meth)acrylates, tetrahydrofurane di(meth)acrylates, hexanediol di(meth)acrylate, trimethylol propane tri(meth)acrylate, or combinations thereof.

Suitable polymerizable (meth)acrylate monomers include triethylene glycol dimethacrylate, tripropylene glycol diacrylate, tetraethylene glycol dimethacrylate, diethylene glycol dimethacrylate, 1,4-butanediol diacrylate, 1,6-hexanediol dimethacrylate, pentaerythritol tetraacrylate, trimethylol propane triacrylate, trimethylol propane trimethacrylate, di-pentaerythritol monohydroxypentaacrylate, pentaerythritol triacrylate, bisphenol-A-ethoxylate dimethacrylate, trimethylolpropane ethoxylate triacrylate, trimethylolpropane propoxylate triacrylate, and bisphenol-A-diepoxide dimethacrylate.

Additionally, the (meth)acrylate monomers include polyethylene glycol di(meth)acrylates, bisphenol-A di(meth)acrylates, tetrahydrofurane (meth)acrylates and di(meth)acrylates, citronellyl acrylate and citronellyl methacrylate, hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate, triethylene glycol acrylate, triethylene glycol methacrylate, and combinations thereof.

Of course, (meth)acrylated silicones may also be used, provided the silicone backbone is not so large so as to minimize the effect of (meth)acrylate when cure occurs.

To cure such (meth)acrylate component through exposure to radiation in the electromagnetic spectrum, a photoinitiator should be included, such as benzoin and substituted benzoins (such as alkyl ester substituted benzoins, like benzoin methyl ether, benzoin ethyl ether, and benzoin isopropyl ether), Michler's ketone, dialkoxyacetophenones [such as diethoxyacetophenone ("DEAP")], benzophenone and substituted benzophenones, such as N-methyl diethanolaminebenzophenone, acetophenone and substituted acetophenones, and xanthone and substituted xanthones, such as diethoxyxanthone and chloro-thioxanthone, azo-bisisobutyronitrile, and mixtures thereof. Visible light initiators include camphoquinone peroxyester initiators and non-fluorene-carboxylic acid peroxyesters.

In addition, the photoinitiators include those available commercially from Ciba Specialty Chemicals, Brewster, New York under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 [the combination of bis(2,6-dimethoxybenzoyl-2,4,4-trimethyl pentyl) phosphine oxide and 2-hydroxy-2-methyl-1-phenyl-propan-1-one], and 819 [bis(2,4,6-trimethyl benzoyl) phenyl phosphine oxide] and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and the visible light [blue] photoinitiators, di-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof.

Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl) phenyl phosphine oxide (e.g., "IRGACURE" 819), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium (e.g., "IRGACURE" 784DC).

Still other photoinitiators include hydrogen abstraction photoinitiators, provided that a hydrogen donor component is used as well. A number of hydrogen abstraction photoinitiators may be employed herein to provide the benefits and advantages of the present invention to which reference is made above. Examples of suitable hydrogen abstraction photoinitiators for use herein include, but are not limited to, benzophenone, benzil (dibenzoyl), xanthone, pentadione, thioxanthrenequinone ("TXAQ"), 2,3-butanedione (diacetyl), phenanthrenequinone ("PAQ"), ethylanthraquinone ("EAQ"), 1,4-chrysenequinone, anthraquinone ("AQ"), camphorquinone ("CQ"), pyrene (benzophenanthrene), benzanthrone and combinations thereof.

Hydrogen donors useful in this regard ordinarily have one or more labile hydrogens attached to a carbon, which is attached to a heteroatom, such as oxygen, or to point of unsaturation. A variety of such materials may be used in the present invention. For instance, ethers, alcohols and allylic compounds are well suited to donote hydrogen, particularly where the ether and alcohol contain more than one such group per molecule, and the allylic compound has more than one allylic hydrogen.

In addition, it may be desirable to use cleavage photinitiators in combination with the hydrogen abstraction photoinitiator.

Generally, the amount of photoinitiator should be in the range of about 0.1% to about 10% by weight, such as about 2 to about 6% by weight.

To cure such (meth)acrylate component through exposure to elevated temperature conditions, a heat cure catalyst should be included, such as azo compounds and peroxides.

More specifically, heat cure catalysts may be chosen from those available commercially from E.I. duPont and de Nemeurs, Wilmington, Del. under the tradenames "LUPERSOL", "DELANOX-F", "ALPEROX-F", "LUCIDOL", "LUPERCO", and "LUPEROX".

Examples include "LUPERSOL" DDM-9 (mixtures of peroxides and hydroperoxides), "LUPERSOL" DDM-30 (mixtures of peroxides and hydroperoxides), "LUPERSOL" DELTA-X-9 (mixtures of peroxides and hydroperoxides), "LUPERSOL" DHD-9 (mixtures of peroxides and hydroperoxides), "LUPERSOL" DFR (mixtures of peroxides and hydroperoxides), "LUPERSOL" DSW-9 (mixtures of peroxides and hydroperoxides), "LUPERSOL" 224 (2,4-pentanedione peroxide), "LUPERSOL" 221 [di(n-propyl) peroxydicarbonate], "LUPERSOL" 225 [di(s-butyl) peroxydicarbonate], "LUPERSOL" 225-M75 [di(s-butyl) peroxydicarbonate], "LUPERSOL" 225-M60 [di(s-butyl) peroxydicarbonate], "LUPERSOL" 223 [di(2-ethylhexyl) peroxydicarbonate], "LUPERSOL" 223-M75 [di(2-ethylhexyl)peroxydicarbonate], "LUPERSOL" 223-M40 [di(2-ethylhexyl)peroxydicarbonate], "LUPERSOL" 219-M60 (diisononanoyl peroxide), "LUCIDOL" 98 (benzoyl peroxide), "LUCIDOL" 78 (benzoyl peroxide), "LUCIDOL" 70 (benzoyl peroxide), "LUPERCO" AFR-400 (benzoyl peroxide), "LUPERCO" AFR-250 (benzoyl peroxide), "LUPERCO" AFR-500 (benzoyl peroxide), "LUPERCO" ANS (benzoyl peroxide), "LUPERCO" ANS-P (benzoyl peroxide), "LUPERCO" ATC (benzoyl peroxide), "LUPERCO" AST (benzoyl peroxide), "LUPERCO" AA (benzoyl peroxide), "LUPERCO" ACP (benzoyl peroxide), "LUPERSOL" 188M75 (cumylperoxy neodecanoate), "LUPERSOL" 688T50 (1,1-dimethyl-3-hydroxy-butyl peroxyneoheptanoate), "LUPERSOL" 688M50 (1,1-dimethyl-3-hydroxy-butyl peroxyneoheptanoate), "LUPERSOL" 288M75 (cumyl peroxyneoheptanoate), "LUPERSOL" 546M75 (t-amylperoxy neodecanoate), "LUPERSOL" 10 (t-butylperoxy neodecanoate), "LUPERSOL" 10M75 (t-butylperoxy neodecanoate), "LUPERSOL" 554M50 (t-amylperoxypivalate), "LUPERSOL" 554M75 (t-amylperoxypivalate), "LUPERSOL" 11 (t-butylperoxypivalate), "LUPERSOL" 665T50 (1-1-dimethyl-3-hydroxy-butylperoxy-2-ethylhexanoate), "LUPERSOL" 665M50 (1-1-dimethyl-3-hydroxy-butylperoxy-2-ethylhexanoate), "LUPERSOL" 256 [2,5-dimethyl-2,5-di(2-ethylhexanoyl peroxy)hexane], "LUPERSOL" 575 (t-amylperoxy-2-ethyl-hexanoate), "LUPERSOL" 575P75 (t-amylperoxy-2-ethyl-hexanoate), "LUPERSOL" 575M75 (t-amylperoxy-2-ethyl-hexanoate), t-BUTYL PEROCTOATE (t-butylperoxy-2-ethylhexanoate), "LUPERSOL" PMS (t-butylperoxy-2-ethylhexanoate), "LUPERSOL" PDO (t-butylperoxy-2-ethylhexanoate), "LUPERSOL" 80 (t-butyl peroxyisobutyrate), "LUPERSOL" PMA (t-butyl peroxymaleic acid), "LUPERCO" PMA-25 (t-butyl peroxymaleic acid), "LUPERSOL" 70 (t-butyl peroxyacetate), "LUPERSOL" 75-M (t-butyl peroxyacetate), LUPERSOL" 76-M (t-butyl peroxyacetate), "LUPERSOL" 555M60 (t-amyl peroxy-acetate), "LUPERSOL" KDB (di-t-butyl diperoxyphthalate), "LUPERSOL" TBIC-M75 (t-butyl-o-isopropyl monoperoxycarbonate), "LUPEROX" 118 [2,5-dimethyl-2,5-di(benzoylperoxy)hexane], "LUPERSOL" TBEC [t-butyl-o-(2-ethylhexyl) monoperoxycarbonate], "LUPERSOL" TAEC [t-amyl-o-(2-ethylhexyl) monoperoxycarbonate], "LUPEROX" 500R (dicumyl peroxide), "LUPEROX" 500T (dicumyl peroxide), "LUPERCO" 500-40C (dicumyl peroxide), "LUPERCO" 500-40E (dicumyl peroxide), "LUPERCO" 500-SRK (dicumyl peroxide), "LUPERSOL" 101 [2,5-dimethyl-2,5-di-(t-butylperoxy) hexane], "LUPERSOL" 101-XL [2,5-dimethyl-2,5-di-(t-butylperoxy) hexane], "LUPERCO" 101-P20 [2,5-dimethyl-2,5-di-(t-butylperoxy) hexane], "LUPERSOL" 801 (t-butyl cumyl peroxide), "LUPERCO" 801-XL (t-butyl cumyl peroxide), "LUPEROX" 802 [bis(t-butylperoxy)diisopropylbenzene], "LUPERCO" 802-40KE [bis(t-butylperoxy)diisopropylbenzene], "LUPERSOL" 130 [2,5-dimethyl-2,5-di-(t-butylperoxy)hexyne-3], "LUPERCO" 130-XL [2,5-dimethyl-2,5-di-(t-butylperoxy) hexyne-3], "LUPEROX" 2,5-2,5 (2,5-dihydro-peroxy-2,5-dimethylhexane), "LUPERSOL" 230 [n-butyl-4,4-di-(t-butylperoxy)valerate], "LUPERCO" 230-XL [n-butyl-4,4-di-(t-butylperoxy)valerate], "LUPERSOL" 231 [1,1-di(t-butylperoxy)-3,3,5-trimethyl cyclohexane], "LUPERCO" 231-XL [1,1-di(t-butylperoxy) 3,3,5-trimethyl cyclohexane], "LUPERSOL" 231-P75 [1,1-di(t-butylperoxy) 3,3,5-trimethyl cyclohexane], "LUPERCO" 231-SRL [1,1-di(t-butylperoxy)-3,3,5-trimethyl cyclohexane], "LUPERSOL" 331-80B [1,1-di(t-butylperoxy)cyclohexane], "LUPERCO" 331-XL [1,1-di(t-butylperoxy)cyclohexane], "LUPERSOL" 531-80B [1,1-di(t-amylperoxy)cyclohexane], "LUPERSOL" 531-80M [1,1-di(t-amylperoxy)cyclohexane], "LUPERSOL" 220-D50 [2,2-di(t-butylperoxy)butane], "LUPERSOL" 233-M75 [ethyl-3,3-di(t-butylperoxy)butyrate], "LUPERCO" 233-XL [ethyl-3,3-di(t-butylperoxy)butyrate], "LUPERSOL" P-31 [2,2-di-(t-amylperoxy)propane], "LUPERSOL" P-33 [2,2-di-(t-amylperoxy)propane], and "LUPERSOL" 553-M75 [ethyl 3,3-di (t-amylperoxy)butyrate].

Other heat cure catalysts include those available commercially from DuPont under the "VAZO" tradename, such as "VAZO" 64 (azobis-isobutyrile nitrile), "VAZO" 67 (butane nitrile, 2-methyl, 2,2'-azobis) and "VAZO" 88 (cyclohexane carbonitrile, 1,1'-azobis).

Generally, the amount of heat cure catalyst should be in the range of about 0.1% to about 10% by weight, such as about 2 to about 6% by weight.

Anaerobic cure-inducing compositions useful in anaerobically-curable versions of the foamable compositions include a variety of components, such as amines (including amine oxides, sulfonamides and triazines). A desirable composition to induce cure includes saccharin, toluidenes, such as N,N-diethyl-p-toluidene and N,N-dimethyl-o-toluidene, acetyl phenylhydrazine ("APH"), and maleic acid. Of course, other materials known to induce anaerobic cure may also be included or substituted therefor. See e.g., U.S. Pat. Nos. 3,218,305 (Krieble), 4,180,640 (Melody), 4,287,330 (Rich) and 4,321,349 (Rich). Quinones, such as napthoquinone and anthraquinone, may also be included to scavenge free radicals that may form. In addition, free-radical initiators, free-radical accelerators, inhibitors of free-radical generation, as well as metal catalysts, may also be added.

Generally, the amount of anaerobic cure-inducing composition should be in the range of about 0.1% to about 10% by weight, such as about 2 to about 6% by weight.

As the epoxy, examples include $C_4$–$C_{28}$ alkyl glycidyl ethers; $C_2$–$C_{28}$ alkyl- and alkenyl-glycidyl esters; $C_1$–$C_{28}$ alkyl-, mono- and poly-phenol glycidyl ethers; polyglycidyl ethers of pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'dihydroxydiphenyl sulfone, and tris(4-hydroxyphyenyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'diaminodiphenyl methane; N,N,N',N'-tetraglycidyl-4,4'diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof.

Among the commercially available epoxy resins suitable for use herein are polyglycidyl derivatives of phenolic compounds, such as those available under the tradenames EPON 828, EPON 1001, EPON 1009, and EPON 1031, from Resolution Performance Products LLC; DER 331, DER 332, DER 334, and DER 542 from Dow Chemical Co.; GY285 from Vantico, Inc., Brewster, N.Y.; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba Specialty Chemicals, Inc. SU-8 is a bisphenol A-type epoxy novolac available from Resolution Performance Products LLC. Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE MY-721, ARALDITE 0500, and ARALDITE 0510 from Ciba Specialty Chemicals, Inc. and PGA-X and PGA-C from the Sherwin-Williams Co. And of course combinations of the different epoxy resins are also useful herein.

Other appropriate epoxy resins suitable for use as the curable matrix component include cycloaliphatic ones, such as those available commercially from Dow under the ERL trade designation like ERL-4221.

In addition, when epoxy functionality is present on the curable matrix component, desirable curing agents include an anhydride component, a nitrogen-containing component, such as an aza compound, an amine compound, an amide compound, and an imidazole compound, and combinations thereof.

Appropriate anhydride compounds for use herein include mono- and poly-anhydrides, such as hexahydrophthalic anhydride ("HHPA") and methyl hexahydrophthalic anhydride ("MHHPA") (commercially available from Lindau Chemicals, Inc., Columbia, S.C., used individually or as a combination, which combination is available under the trade designation "LINDRIDE" 62C), 5-(2,5-dioxotetrahydrol)-3-methyl-3-cyclohexene-1,2-dicarboxylic anhydride (commercially available from ChrisKev Co., Leewood, Kans. under the trade designation B-4400) and nadic methyl anhydride.

Of course, combinations of these anhydryde compounds are also desirable for use in the compositions of the present invention.

The nitrogen-containing compounds include aza compounds (such as di-aza compounds or tri-aza compounds), examples of which include:

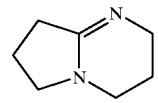

1,5-Diazabicyclo[4.3.0]non-5-ene

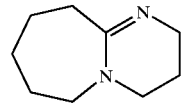

1,8-Diazabicyclo[5.4.0]undec-5-ene (DBU

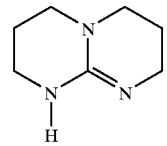

1,5,7-Triazabicyclo[4.4.0]dec-5-ene and the bicyclo mono- and di-aza compounds:

Quinuclidine

1,4-Diazabicyclo[2.2.2]octane

Examples of the amine compounds include aliphatic polyamines, such as diethylenetriamine, triethylenetetramine and diethylaminopropylamine; aromatic polyamines, such as m-xylenediamine and diaminodiphenylamine; and alicyclic polyamines, such as isophoronediamine and menthenediamine.

Of course, combinations of these amine compounds are also desirable for use in the compositions of the present invention.

Examples of amide compounds include cyano-functionalized amides, such as dicyandiamide.

The imidazole compounds may be chosen from imidazole, isoimidazole, and substituted imidazoles—such as alkyl-substituted imidazoles (e.g., 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 2-heptadecylimidazole, 1-benzyl-2-methylimidazole, 1-propyl-2-methylimidazole, 1-cyanoethyl-2-methylimidazole, 1-cyanoethyl-1-cyanoethyl-2-undecylimidazole, 1-cyanoethyl-2-phenylimidazole, 1-guanaminoethyl-2-methylimidazole and addition products of an imidazole and trimellitic acid, 2-n-heptadecyl-4-methylimidazole and the like, generally where each alkyl substituent contains up to about 17 carbon atoms and desirably up to about 6 carbon atoms), and aryl-substituted imidazoles [e.g., phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4, 5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, 2-p-methoxystyrylimidazole, and the like, generally where each aryl substituent contains up to about 10 carbon atoms and desirably up to about 8 carbon atoms].

Examples of commercial imidazole compounds are available from Air Products, Allentown, Pa. under the trade designation "CUREZOL" 1B2MZ and from Synthron, Inc., Morganton, N.C. under the trade designation "ACTIRON" NXJ-60.

Examples of the modified imidazole compounds include imidazole adducts formed by the addition of an imidazole compound to an epoxy compound. For instance, "AJI-CURE" PN-23, commercially available from Ajinomoto Co., Inc., Tokyo, Japan, is believed to be an adduct of EPON 828 (bisphenol-A-type epoxy resin, epoxy equivalent 184–194, commercially available from Resolution Performance Products LLC), 2-ethyl-4-methylimidazole and phthalic anhydride. Others commercially available ones from Ajinomoto include "AMICURE" MY-24, "AMICURE" GG-216 and "AMICURE" ATU CARBAMATE. In addition, "NOVACURE" HX-3722 (an imidazole/bisphenol A epoxy adduct dispersed in bisphenol A epoxy) and "NOVACURE" HX-3921 HP, commercially available from Asahi-Ciba, Ltd., may also be used.

Of course, combinations of these imidazole compounds are also desirable for use in the compositions of the present invention.

The curing agent for the curable matrix component with epoxy functionality present may be used in an amount of from about 3 to about 100 weight percent, based on the weight of the curable aromatic resin component, depending of course on the type and identity of the curing agent component.

Notwithstanding that which is described above, the amount of the initiator or catalyst will depend on the nature and identity of the curable matrix component, as well.

Examples of the thermoplastic oligomers and polymers that may benefit from the photo-induced foaming agent include those with a melting point of less than or equal about 100° C. For instance poly(olefins), poly(dienes), poly(peptides), poly(esters), poly(ethers), poly(oxides), poly(sulfides), and poly(amines). More specific examples of such thermoplastic oligomers and polymers include syndiotactic polybutatene, with a melting point of 45° C., alpha-polyisoprene, with a melting point of 80° C., poly(2-butyl-2-methyl-beta-alanine), with a melting point of 72° C., poly(decamethylene 4-octendioate), with a melting point of 53° C., poly(butylvinyl ether), with a melting point of 64° C., poly(decamethylene oxide), with a melting point of 79° C., poly(hexamethylene sulfide), with a melting point of 90° C., and poly(ethylene amine), with a melting point of 58° C. For additional examples, see R. Miller, *Polymer Handbook*, chap. 4, $4^{th}$ ed., J. Bandrup et al., eds., J. Wiley & Sons, New York (1999).

The latent foamable composition of the present invention may further include stabilizers, accelerators, fillers, thickeners, viscosity modifiers, adhesion promoters, inhibitors, thixotropy conferring agents, tougheners, anti-oxidizing agents, anti-reducing agents, and combinations thereof. These optional additives are used in an amount that do not significantly adversely affect the polymerization process or the desired properties of the cured composition.

With respect to formulating latent foamable compositions, generally the components may be introduced to one another in any convenient order. Alternatively, it may be desirable to prepare a premix of the latent foaming agent and the initiator component. In this way, a ready made premix of those components may be added to the curable or thermoplastic component of the formulation to allow for a quick and easy one-part formulation prior to dispensing, foaming and curing thereof.

For packaging and dispensing purposes, it may be desirable for latent foamable compositions in accordance with the present invention to be relatively fluid and flowable. Variations in the viscosity thereof may also be desirable in certain applications and may be readily achieved through routine changes in formulation, the precise changes being left to those persons of ordinary skill in the art.

The following examples describe the preparation and use of latent curable compositions of the present invention. These examples are presented for the purpose of further illustrating and explaining the invention, and are not to be taken as limiting the scope of the invention.

EXAMPLES

All starting materials and solvents were all purchased from the Aldrich Chemical Company, and were used without further purification.

Nuclear Magnetic Resonance ($^1$H NMR and $^{13}$C NMR) analyses were performed on a Varian 300 Hz Gemini Spectophotometer. Infrared ("IR") spectra were obtained neat on an ATI Mattson Genesis series FTIR spectrophotomer or a Perkin-Elmer Spectrum One FT-IR spectrophotomer. Photodifferential scanning calorimetry ("PhotoDSC") analyses were performed on a TA Instruments 2920 Differential Scanning Calorimeter, equipped with a Photocalorimetry Attachment. Thermogravimetric analysis ("TGA") data was acquired on a TA Instruments 2950 Thermogravimetric Analyzer.

In general, preparation of the inventive latent foaming agents involved reaction of an aliphatic acid chloride with the sodium salt of 2-mercaptopyridine-1-oxide in toluene, with dimethylaminopyridine ("DMAP") as a catalyst to form the o-acylthiohyroxamate, 1, as seen in eq. 2.

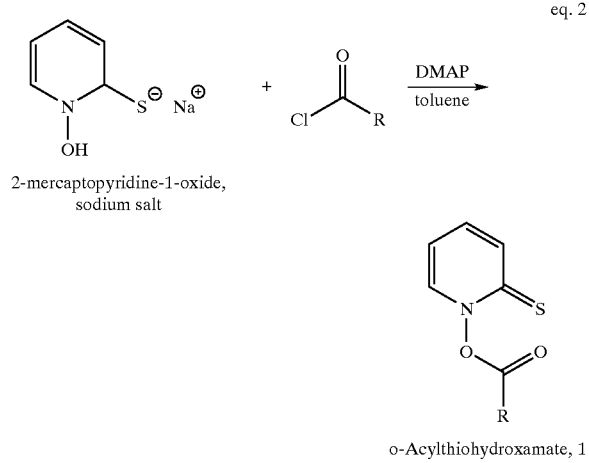

Six o-acylthiohydroxamates, 3–8, within the scope of this invention were prepared by this method, details for which are given below.

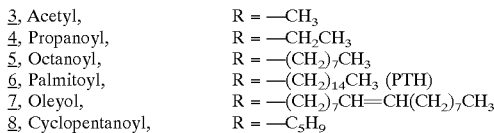

| | |
|---|---|
| 3, Acetyl, | R = —CH$_3$ |
| 4, Propanoyl, | R = —CH$_2$CH$_3$ |
| 5, Octanoyl, | R = —(CH$_2$)$_7$CH$_3$ |
| 6, Palmitoyl, | R = —(CH$_2$)$_{14}$CH$_3$ (PTH) |
| 7, Oleyol, | R = —(CH$_2$)$_7$CH═CH(CH$_2$)$_7$CH$_3$ |
| 8, Cyclopentanoyl, | R = —C$_5$H$_9$ |

General Synthetic Procedure

To a 500 mL flask, equipped with a mechanical stirrer, an addition funnel, and a nitrogen inlet, 2-mercaptopyridine-1-oxide sodium salt (17.9 g, 120 mmol) and DMAP (0.12 g, 1 mmol) were added to CH$_2$Cl$_2$ (300 mL). After stirring for 15 minutes, the acid chloride (100 mmol) was added slowly to the reaction mixture, which becomes bright yellow in color. The reaction mixture was stirred under nitrogen for 1–2 hrs. Solid impurities were filtered out of the reaction mixture. The organic layer was washed twice each with 200 mL of 1M aq. KHSO$_4$, 200 mL of 5% aq. NaHCO$_3$, and 200 mL of water. The organic layer was then dried (K$_2$CO$_3$), filtered, and solvent removed under reduced pressure. The products were dried in a vacuum oven overnight at a temperature of 40° C. under best vacuum.

Product Appearance, Yield, and Spectral Data Acetyl Thiohydroxamate, 3

Yellow solid; Yield=10 g (64%); $^1$H NMR (CDCl$_3$): δ 7.8 (m, 2, ═CH), 7.2 (m, 1, ═CH), 6.6 (m, 1, ═CH), 2.5 (s, 3, CH$_3$); $^{13}$C NMR (CDCl$_3$): δ 176, 167, 138.2, 138, 134, 113, 19; IR (neat): 3065, 3020, 1797, 1607, 1416, 1146, 857, 751 cm$^{-1}$.

Propionyl Thiohydroxamate, 4

Yellow liquid; Yield=7.8 g (42 %); $^1$H NMR (CDCl$_3$): δ 7.8 (m, 2, ═CH), 7.2 (m, 1, ═CH), 6.6 (m, 1, ═CH), 2.5 (m, 2, COCH$_2$), 1.2 (m, 3, CH$_3$); $^{13}$C NMR (CDCl$_3$): δ 176, 170, 138, 137, 134, 113, 29, 8; IR (KBr): 3098, 2985, 1806, 1607, 1527, 1449, 1412, 1134, 1050, 846, 750 cm$^{-1}$.

Octanoyl Thiohydroxamate, 5

Yellow liquid; Yield=18.8 g (74 %); $^1$H NMR (CDCl$_3$): δ 7.7 (m, 2, ═CH), 7.2 (m, 1, ═CH), 6.6 (m, 1, ═CH), 2.7 (m, 2, COCH$_2$), 1.1–1.9 (m, 10, CH$_2$), 0.9 (m, 3, CH$_3$); $^{13}$C NMR (CDCl$_3$): δ 176, 170, 138, 137, 134, 113, 32, 29.2, 29, 24, 22, 16; IR (neat): 3092, 2924, 1810, 1607, 1527, 1448, 1411, 1132, 1061, 751 cm$^{-1}$.

Palmitoyl Thiohydroxamate, 6

Yellow solid; Yield=21.6 g (61%); $^1$H NMR (CDCl$_3$): δ 7.6 (m, 2, ═CH), 7.2 (m, 1, ═CH), 6.6 (m, 1, ═CH), 2.7 (m, 2, COCH$_2$), 1.1–1.9 (m, 22, CH$_2$), 0.9 (m, 3, CH$_3$); $^{13}$C NMR (CDCl$_3$): δ 176, 170, 139.2, 139, 134, 113, 32.2, 32, 30, 39.8, 39.6, 24, 22, 15; IR (KBr): 3090, 2917, 2849, 1809, 1606, 1528, 1450, 1409, 1136, 1068, 1056, 890, 736 cm$^{-1}$.

Oleoyl Thiohydroxamate, 7

Amber liquid; Yield=35.7 g (94 %); $^1$H NMR (CDCl$_3$): δ 7.6 (m, 2, ═CH), 7.2 (m, 1, ═CH), 6.6 (m, 1, ═CH), 5.4 (m, 2, RCH═CHR), 2.7 (m, 2, COCH$_2$), 2.0 (br s, 4, C═C—CH$_2$), 1.1–1.9 (m, 22, CH$_2$), 0.9 (s, 3, CH$_3$); $^{13}$C NMR (CDCl$_3$): δ 176, 170, 139.2, 139, 134, 130, 129.6, 113, 32.2, 32, multiple peaks at 30±0.5, 28, 25, 23, 15; IR (KBr): 3004, 2924, 2853, 1808, 1608, 1526, 1448, 1411, 1134, 1056, 731 cm$^{-1}$.

Cyclopentanoyl Thiohydroxamate, 8

Amber liquid; Yield=18.3 g (87 %); $^1$H NMR (CDCl$_3$) δ 7.6 (m, 2, ═CH), 7.2 (m, 1, ═CH), 6.6 (m, 1, ═CH), 3.1 (m, 2, COCH$_2$), 1.6–2.4 (m, 8, CH$_2$); $^{13}$C NMR (CDCl$_3$): δ 176, 172, 139.2, 139, 134, 113, 42, 30, 26; IR (neat): 3091, 2960, 2871, 1800, 1607, 1526, 1448, 1410, 1178, 1134, 1055, 922, 838, 745 cm$^{-1}$.

TGA Analysis of Latent Foaming Agent

The o-acylthiohydroxamates were evaluated by thermogravimetric analysis ("TGA") to determine their relative thermal stability. A 5–10 mg sample of the o-acylthiohydroxamate was placed in the TGA instrument and was heated at 20° C./minute to a temperature of 500° C. TGA analysis for acetyl thiohydroxamate, 3, palmitoyl thiohydroxamate, 6, and oleoyl thiohydroxamate, 7, are shown in FIG. 1, which indicates decomposition beginning at temperatures about 100° C.

Latent Foamable Curable Compositions

Photo-induced foamable compositions were prepared from the noted components in the respective amounts, as shown in Table 1.

TABLE 1

| Material | phr |
|---|---|
| Urethane/Acrylate Block Resin | 75 |
| N,N-Dimethylacrylamide | 25 |
| Darocure 1173 | 1 |
| o-Acyl Thiohydroxamate | 0–8 |

Production of a Photo-Induced Foam

At concentrations of 2 phr or greater, the generation of a foam from the urethane (meth)acrylate-based curable composition was observed concurrent with exposure to UV radiation, within a LOCTITE ZETA 7215 UV Curing Camber. A bead of the composition was dispensed on a substrate and placed in the curing chamber for subsequent UV expo sure. Foaming data for the composition with different concentrations of palmitoyl thiohydroxamate ("PTH"), 6, is given in Table 2.

TABLE 2

| Phr of PTH | % Increase in Height |
|---|---|
| 0 | 0 |
| 0.5 | 0 |
| 0.75 | 0 |
| 1.0 | 0 |
| 2.0 | 8 |
| 3.0 | 84 |
| 4.0 | 113 |

The addition of PTH, 6, produces a dry, closed-cell foam, which was generated with UV radiation at intensities as low as 50 mW/cm$^2$.

Production of Heat-Induced Foam

Formulations, which contained a heat cure catalyst, such as a peroxide, as the initiator instead of a photoinitiator as set forth in Table 1 above, were prepared using peroxide initiators with one hour half-life decomposition temperatures ranging from 80° C. to 140° C., as shown below in Table 3.

TABLE 3

| Peroxide | Chemical Name | $T_{1/2}$ 1 hour (° C.) |
|---|---|---|
| Luperox LP | Lauroyl Peroxide | 81 |
| Luperox A98 | Benzoyl Peroxide | 92 |
| Luperox P | t-Butyl Peroxybenzoate | 121 |
| Luperox TBEC | t-Butylperoxy 2-ethylhexyl Carbonate | 125 |
| Luperox DC | Dicumyl Peroxide | 137 |
| Luperox 101 | 2,5-Bis(t-butylperoxy)-2,5-dimethyl hexane | 140 |

Heat-induced foamable compositions were prepared from the noted components in the respective amounts, as shown in Table 4.

TABLE 4

| Material | Phr |
|---|---|
| Urethane/Acrylate Block Resin | 75 |
| N,N-Dimethylacrylamide | 25 |
| Palmitoyl thiohydroxamate (PTH) | 8 |
| Peroxide | 2 |

When the peroxide initiator was added, each formulation was mixed with care to prevent the generation of heat during the mixing process. Approximately 7 grams of each formulation was weighed into three aluminum pans, and a sample for each thiohydroxamate was heated for one hour at a temperature of 80° C., at a temperature of 110° C., and at a temperature of 140° C. Formulations containing no additives (Table 5, Sample No. 1) and 8% PTH alone (Table 5, Sample No. 2), were used as controls. The data from these experiments are summarized in Table 5.

TABLE 5

| No. | Additive/Peroxide | 80° C. | 110° C. | 140° C. |
|---|---|---|---|---|
| 1. | None | X | X | X |
| 2. | 8% PTH alone | X | X | X |
| 3. | 8% PTH/2% Luperox LP | foam | foam | foam |
| 4. | 8% PTH/2% Luperox A98 | foam | foam | foam |
| 5. | 8% PTH/2% Luperox P | X | foam | foam |

TABLE 5-continued

| No. | Additive/Peroxide | 80° C. | 110° C. | 140° C. |
|---|---|---|---|---|
| 6. | 8% PTH/2% Luperox TBEC | X | foam | foam |
| 7. | 8% PTH/2% Luperox DC | X | X | foam |
| 8. | 8% PTH/2% Luperox 101 | X | X | foam |

X = no foam formation

Foaming was observed for Sample Nos. 3–8, as indicated, with a doubling in height as compared to the uncured material. The temperatures at which the foams were generated were consistent with the peroxide initiator one hour half-life decomposition temperatures.

The control formulations (Sample Nos. 1 and 2) containing no additives and 8% PTH without any peroxide initiator, did not generate a foam, even at a temperature of 140° C.

Evaluation of Photocure for Formulations with Latent Foaming Agent but Without Separate Photoinitiator The formulation with 8% PTH alone, without added photoinitiator or peroxide, was exposed to UV radiation for 20 seconds. A cured, foamed polymer formed, with a decreased cure-through-depth, as compared to the formulation, which contained a photoinitiator.

What is claimed is:

1. A latent foamable composition, comprising:
   (a) a matrix component; and
   (b) a latent foaming agent, wherein upon exposure to conditions sufficient to cause the latent foaming agent to foam, at a concentration of 2 phr the composition is capable of increasing in size in at least one direction by 8%,

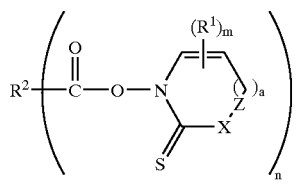

wherein $R^1$ is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl or $C_{2-24}$ alkenyl, X is carbon or sulfur, Z is a single bond or double bond, a is 0 or 1, m is 0–4, and n is 1–4.

2. A latent foamable curable composition, comprising:
   (a) a curable matrix component; and
   (b) a latent foaming agent, wherein upon exposure to conditions sufficient to cause the latent foaming agent to foam, at a concentration of 2 phr the composition is capable of increasing in size in at least one direction by 8%,

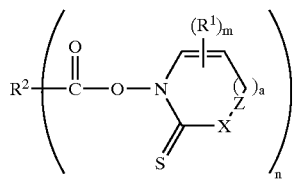

wherein $R^1$ is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl or $C_{2-24}$ alkenyl, X is carbon or sulfur, Z is a single bond or double bond, a is 0 or 1, m is 0–4, and n is 1–4.

3. A latent foamable curable composition, comprising:
(a) a curable component;
(b) an initiator component; and
(c) a latent foaming agent, wherein upon exposure to conditions sufficient to cause the latent foaming agent to foam, at a concentration of 2 phr the composition is capable of increasing in size in at least one direction by 8%,

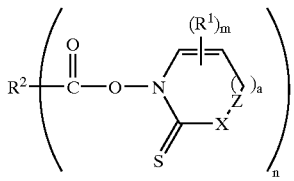

wherein $R^1$ is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl or $C_{2-24}$ alkenyl, X is carbon or sulfur, Z is a single bond or double bond, a is 0 or 1, m is 0–4, and n is 1–4.

4. A latent foamable curable composition, comprising:
(a) a curable component; and
(b) a latent foaming agent, provided that (meth)acrylate is not the only component of the curable matrix component,

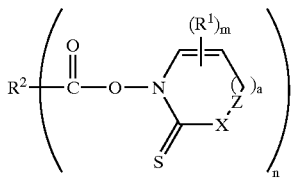

wherein $R^1$ is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl or $C_{2-24}$ alkenyl, X is carbon or sulfur, Z is a single bond or double bond, a is 0 or 1, m is 0–4, and n is 1–4.

5. The composition of claim 1, wherein the matrix component is functionalized with one or more groups selected from the group consisting of (meth)acrylate, silyl alkoxide, silyl aryloxide, silyl vinyl, vinyl ether, silicon hydride, hydroxyl, isocyanate and epoxy.

6. The composition of claim 2, wherein the curable matrix component is functionalized with one or more groups selected from the group consisting of (meth)acrylate, silyl alkoxide, silyl aryloxide, silyl vinyl, vinyl ether, silicon hydride, hydroxyl, isocyanate and epoxy.

7. The composition of claim 3, wherein the curable component is functionalized with one or more groups selected from the group consisting of (meth)acrylate, silyl alkoxide, silyl aryloxide, silyl vinyl, vinyl ether, silicon hydride, hydroxyl, isocyanate and epoxy.

8. The composition of claim 4, wherein the curable component is functionalized with one or more groups selected from the group consisting of (meth)acrylate, silyl alkoxide, silyl aryloxide, silyl vinyl, vinyl ether, silicon hydride, hydroxyl, isocyanate and epoxy.

9. The composition of claim 1, wherein the matrix component is a (meth)acrylate component comprising one or more members selected from the group consisting of a monomer represented by the formula:

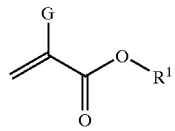

wherein G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone;

a di- or tri-(meth)acrylate comprising polyethylene glycol di(meth)acrylates, bisphenol-A di(meth)acrylates, tetrahydrofurane di(meth)acrylates, hexanediol di(meth) acrylate, trimethylol propane tri(meth)acrylate, or combinations thereof;

urethane (meth)acrylates or ureide (meth)acrylates represented by the formula:

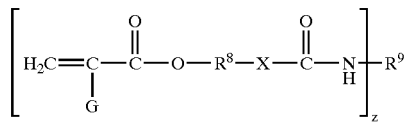

wherein G is hydrogen, halogen, or an alkyl having from 1 to 4 carbon atoms;

$R^8$ denotes a divalent aliphatic, cycloaliphatic, aromatic, or araliphatic group, bound through a carbon atom or carbon atoms thereof indicated at the —O— atom and —X— atom or group;

X is —O—, —NH—, or —N(alkyl)—, in which the alkyl radical has from 1 to 8 carbon atoms;

z is 2 to 6; and $R^9$ is a z-valent cycloaliphatic, aromatic, or araliphatic group bound through a carbon atom or carbon atoms thereof to the one or more NH groups.

10. The composition of claim 1, wherein the latent foaming agent comprises the following structure

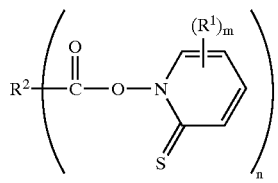

wherein $R^1$ is H, $C_{1-4}$ alkyl, with or without interruption or substitution by oxygen, sulfur, and nitrogen, or $R^2$ is $C_{1-24}$ alkyl, with or without interruption or substitution by oxygen, sulfur, nitrogen, aralkyl or $C_{2-24}$ alkenyl, m is 0–4, and n is 1–4.

11. The composition of claim 1, wherein the latent foaming agent comprises the following structure

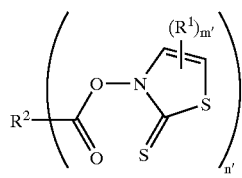

wherein $R^1$ is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl or $C_{2-24}$ alkenyl, m' is 0–2, and n' is 1–4.

12. The composition of claim 1, wherein the matrix component is a member selected from the group consisting of the thermoplastic oligomers and polymers.

13. The composition of claim 12, wherein the matrix component has a melting point of less than or equal to about 100° C.

14. The composition of claim 12, wherein the matrix component is a member selected from the group consisting of poly(olefins), poly(dienes), poly(peptides), poly(esters), poly(ethers), poly(oxides), poly(sulfides), and poly(amines).

15. The composition of claim 12, wherein the matrix component is a member selected from the group consisting of syndiotactic polybutatene, with a melting point of 45° C., alpha-polyisoprene, with a melting point of 80° C., poly(2-butyl-2-methyl-beta-alanine), with a melting point of 72° C., poly(decamethylene 4-octendioate), with a melting point of 53° C., poly(butylvinyl ether), with a melting point of 64° C., poly(decamethylene oxide), with a melting point of 79° C., poly(hexamethylene sulfide), with a melting point of 90° C., and poly(ethylene amine), with a melting point of 58° C.

16. The composition of claim 1, wherein the latent foaming agent is a member selected from the group consisting of acetyl thiohydroxamate, propionyl thiohydroxamate, octanoyl thiohydroxamate, palmitoyl thiohydroxamate, oleoyl thiohydroxamate, cyclopentanoyl thiohydroxamate, and combinations thereof.

17. The composition of claim 1, wherein the latent foaming agent is a member selected from the group consisting of O-esters of 4-methyl-N-hydroxy thiazolethione, 3-palmitoyl-4-phenyl thiazolethione, 3,3-diphenylpropionyl thiazolethione, palmitoyl thiazolethione, and combinations thereof.

18. The composition of claim 1, further comprising a member selected from the group consisting of stabilizers, accelerators, fillers, thickeners, viscosity modifiers, adhesion promoters, inhibitors, thixotrophy conferring agents, tougheners, anti-oxidizing agents, anti-reducing agents, and combinations thereof.

19. A method of making a foamable composition comprising the steps of
providing a matrix component;
providing a latent foaming agent, wherein the latent foaming agent is embraced by the following structure

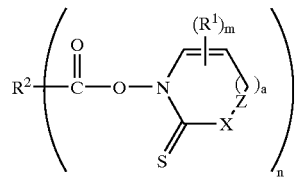

wherein $R^1$ is H, $C_{1-4}$ alkyl, with or without interruption or substitution by oxygen, sulfur, and nitrogen, $R^2$ is $C_{1-24}$ alkyl, with or without interruption or substitution by oxygen, sulfur, nitrogen, aralkyl or $C_{2-24}$ alkenyl, X is carbon or 1, m is 0-4, and n is 1–4; and
mixing together the matrix component and the latent foaming agent to form the foamable composition.

20. A method of making a foamed composition comprising the steps of
providing the composition of claim 1; and
exposing the composition to conditions sufficient to foam the composition.

21. A method of assembling articles comprising the steps of
providing a first part with a surface;
dispensing onto at least a portion of the surface of the part the composition of claim 1;
providing a second part with a surface and joining the surface of the second part with the composition coated surface of the first part to form an assembly; and
exposing the assembly to conditions sufficient to foam the composition.

22. The method of claim 20, wherein conditions sufficient to foam the composition include exposure to radiation in the electromagnetic spectrum.

23. The method of claim 21, wherein conditions sufficient to foam the composition include exposure to radiation in the electromagnetic spectrum.

24. A foamed composition of claim 1.

25. A cured foamed composition of claim 2.

* * * * *